Feb. 25, 1930.                    D. A. GREENE                    1,748,216
                                 WINDOW CHANNEL
                               Filed May 20, 1929

INVENTOR
Daniel A. Greene
BY
ATTORNEYS

Patented Feb. 25, 1930

1,748,216

UNITED STATES PATENT OFFICE

DANIEL A. GREENE, OF FLINT, MICHIGAN

WINDOW CHANNEL

Application filed May 20, 1929. Serial No. 364,610.

This invention relates to window channels and has particular reference to a window channel or glass run formed of laminated flexible material.

One of the primary objects of this invention is to provide a window channel which will readily adapt itself to glass panes of different thicknesses and which will at all times snugly engage the glass pane to prevent rattling and the like.

A still further object of this invention is to provide a window channel which will be simple in construction and which may be economically produced on a commercial scale.

Other objects and advantages of the invention together with the numerous novel details of construction will become more apparent as the following description proceeds, particularly when reference is had to the accompanying drawings, wherein Figure 1 is a perspective view of a window channel constructed in accordance with the teachings of this invention;

Figure 1:
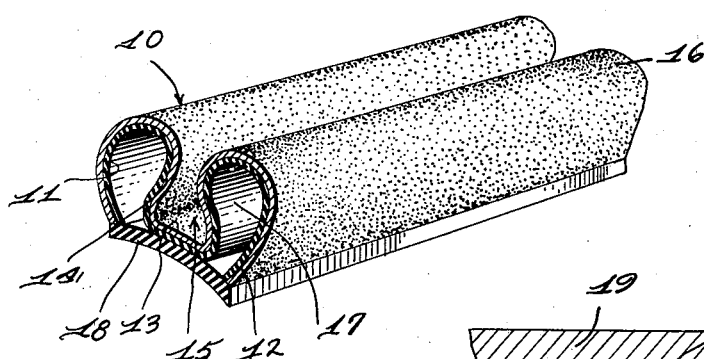

In the drawings wherein like reference characters designate corresponding parts throughout all views, the numeral 10 designates generally a strip of laminated flexible material which may, as illustrated, comprise a rubber backing strip 11 and a felt facing strip 12. While it has been found preferable to use felt as the facing strip, it is to be clearly understood that the invention is not limited to the use of felt as the facing strip. Various other materials might be used for covering the rubber in so far as these materials give the desired finish to the window channel and permit the glass to run smoothly.

In forming the window channel, the laminated strip 10 is preferably first formed as a flat strip, the rubber and felt being secured or cemented together in any desired manner. For example, a thin sheet of rubber, cured or uncured, may be covered with a flat strip of felt, and this sheet of rubber may be rolled or pressed into the felt. If desired the strip of felt may be saturated with a rubber compound or cement, the rubber compound being applied preferably to one side only of the felt. After the laminated strip is formed it is then shaped to the desired configuration and cured. In so far as the present invention is concerned, it is immaterial whether the flexible strip from which the channel is formed is made of separate strips of felt and rubber united into an integral structure, or whether the strip is formed of felt impregnated or saturated with rubber compound or cement. Therefore, the terms "laminated material" or "laminated strip of rubber and felt" hereinafter employed are considered as general terms covering any of the aforementioned structures.

By reference to Figure 1, it will be noted that the laminated strip is shaped to form the base 13 and sides 14 of a channel designated generally by the reference character 15. The sides converge inwardly as shown and the free edges of the sides are returnbent as at 16 to extend downwardly to points adjacent the base 13. Thus, air cushions 17 are formed on opposite sides of the channel 15 and these air cushions adapt the channel to accommodate either thick or thin glass and prevent the glass from rattling in the channel regardless of its thickness. After the strip 10 has been shaped to the form desired, it is cured to shape, thus providing a glass runway of the desired configuration.

As illustrated in Figure 1, there may be provided a rubber base 18 for the strip 10 on which the base 13 of the channel and the free edges of the strip rest. This base may be cured to the desired size and shape with the channel and may be curved as illustrated to form an air cushion which will press snugly against the edges of the glass to prevent side play and rattle. If desired the base 13 of the channel 15 as well as the longitudinal edges of the strip 10 may be secured to the base 18 during the curing operation although it will be readily apparent that if desired the longitudinal edges of the strip 10 may be left free from attachment to the base 18, merely resting on the same when the runway is assembled in a frame.

Figure 2:
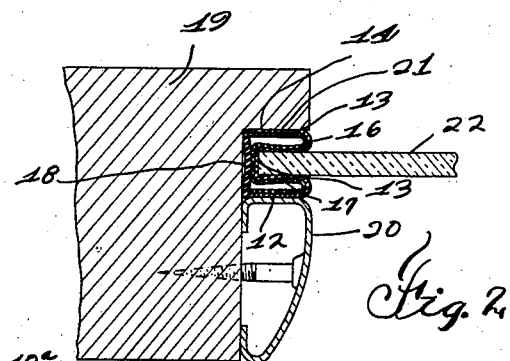
Figure 2 is a sectional view through a window channel constructed in accordance with the teachings of this invention showing the same in position in a frame.

In Figure 2 a channel or runway such as disclosed in Figure 1 is shown in position in a suitable frame 19. In accordance with the usual practice there is provided a garnish strip 20 cooperating with the shoulder 21 on the frame 19 to form a groove for the glass 22. It frequently happens that the garnish strip 20 is not properly positioned with reference to the shoulder 21 and it will be noted by reference to Figure 2 of the drawing that the air cushions 17 readily adapt themselves to the groove formed by the garnish strip and shoulder 21 to grip the glass 22 irrespective of the width of the groove.

Figure 3:
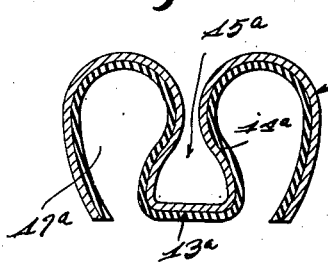
Figure 3 is a detail sectional view of a slightly modified form of construction.

In Figure 3 a slightly modified form of construction is shown in which the strip $10^a$ is shaped in the manner above described to form a channel $15^a$ having the base $13^a$ and sides $14^a$. The base $13^a$ may be flat as illustrated or may be curved to form an air cushion similar to that formed by the base 18 in Figure 1. In this form the base 18 is omitted so that the air cushions $17^a$ formed by the return-bent portions of the sides of the channel are open at their lower edges. When, however, this channel is positioned in a window receiving groove the cushions $17^a$ will readily adapt themselves to the width of the groove and the thickness of the glass in the manner above brought out.

Figure 4:
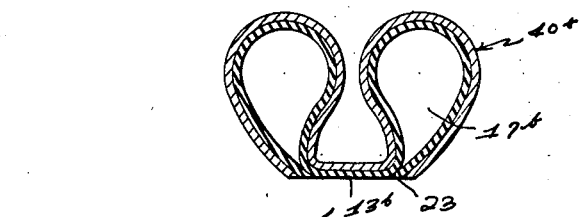
Figure 4 is a view similar to Figure 3 of a further modified form of construction.

In Figure 4 a still further modification is illustrated in which the free edges of the strip $10^b$ are return-bent in the manner described with reference to Figure 1 but are secured as at 23 to the base $13^b$ of the channel. In this form the base 18 is omitted but the air cushions $17^b$ are closed at their lower edges the same as are the cushions 17. In this form of construction the base $13^b$ of the channel may also be curved to form a cushion in the same manner as the base 18 shown in Figure 1.

Figure 5:
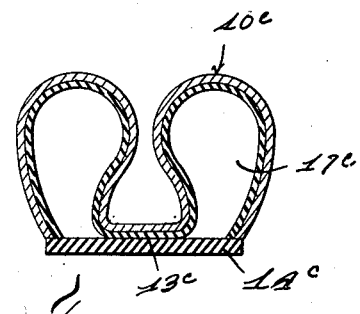
Figure 5 is a view similar to Figure 3 of still another modification of the inventive idea.

In Figure 5 a still further modification of the invention is shown in which the strip $10^c$ is shaped to form a channel the same as above described and in which the base $13^c$ of this channel together with the free edges of the strip are engaged to a flat rubber base $18^c$. It will be readily apparent that the base $13^c$ of the channel as well as the longitudinal edges of the strip $10^c$ may be secured to the base $18^c$ if desired. However, the longitudinal edges of the strip $10^c$ may be left free from attachment to the base $18^c$ whereby the lower sides of the air cushions $17^c$ will not be tightly closed.

In each of the modifications illustrated, the rubber is formed to the desired shape and is then cured while in this shape to form a window channel of the desired configuration. The rubber and felt may be first secured together to form a flat laminated strip which is afterwards cured to shape as described, or the rubber may be first formed and cured to shape and the felt subsequently applied to the shaped strip of rubber in any desired manner. In each case, however, the rubber is shaped to the desired configuration and is then cured while so shaped.

While the invention has been described with considerable detail it will be readily apparent that the inventive principles disclosed may be incorporated into numerous modifications other than those specifically illustrated and described. It is therefore to be clearly understood that the description is for the purposes of illustration only and is not definitive of the limits of the inventive idea, the right being reserved to make such changes in the details of construction and arrangement of parts as will fall within the purview of the attached claims.

What I claim as my invention is:

1. A window channel comprising a strip of flexible laminated material shaped to form the base and sides of a channel, the sides being bent outwardly and downwardly to form air cushions on opposite sides of said channel extending throughout substantially the entire width thereof.

2. A glass runway comprising a laminated strip of rubber and felt, shaped to form the base and sides of a channel, the sides converging inwardly, the edges of the said strip being return-bent to form an air cushion adjacent each side the depth of the channel, the said strip being cured while so shaped.

3. A glass runway comprising a laminated strip of rubber and felt, shaped to form a channel and an air cushion an each side of said channel, and a rubber base for said strip, the base of said channel and the edges of said air cushions engaging the said base.

4. A glass runway comprising a laminated strip of rubber and felt, shaped to form the base and sides of a channel, the edges of said strip being return-bent to form an air cushion adjacent each of said sides, and a base for said strip, the base of said channel and the edges of said strip being secured to said base.

5. A glass runway comprising a laminated strip of rubber and felt, shaped to form the base and sides of a channel, the edges of said strip being return-bent to lie in spaced relation to said sides and terminating adjacent the said base.

6. A runway for windows comprising a strip of flexible laminated material shaped to from the base and sides of a channel, the edges of said strip being outwardly return-bent to form air cushions at each side of said channel, the said edges terminating exteriorly of said channel adjacent the base thereof.

In testimony whereof I affix my signature.

DANIEL A. GREENE.